US012207641B1

(12) United States Patent
He

(10) Patent No.: US 12,207,641 B1
(45) Date of Patent: Jan. 28, 2025

(54) BUG ZAPPER

(71) Applicant: Xiaoling He, Shenzhen (CN)

(72) Inventor: Xiaoling He, Shenzhen (CN)

( * ) Notice: Subject to any disclaimer, the term of this patent is extended or adjusted under 35 U.S.C. 154(b) by 0 days.

(21) Appl. No.: 18/633,884

(22) Filed: Apr. 12, 2024

(51) Int. Cl.
*A01M 1/22* (2006.01)
*A01M 1/04* (2006.01)

(52) U.S. Cl.
CPC ............... *A01M 1/223* (2013.01); *A01M 1/04* (2013.01)

(58) Field of Classification Search
CPC ........... A01M 1/22; A01M 1/223; A01M 1/04
USPC ..................................................... 43/112, 113
See application file for complete search history.

(56) References Cited

U.S. PATENT DOCUMENTS

| | | | | |
|---|---|---|---|---|
| 3,473,251 | A * | 10/1969 | Kahn ..................... | A01M 1/223 43/112 |
| 4,454,677 | A * | 6/1984 | Chuang .................. | A01M 1/223 43/112 |
| 4,523,404 | A * | 6/1985 | DeYoreo ................. | A01M 1/04 43/112 |
| 4,852,296 | A * | 8/1989 | Swanson ................. | A01M 1/04 43/112 |
| 5,020,270 | A * | 6/1991 | Lo ........................... | A01M 1/08 43/112 |
| 6,055,766 | A * | 5/2000 | Nolen ..................... | A01M 1/023 43/112 |
| 8,875,437 | B1 * | 11/2014 | Xie ......................... | A01M 1/223 43/112 |
| 10,337,675 | B2 * | 7/2019 | Van Kleef .............. | A01M 1/145 |
| 10,412,953 | B2 * | 9/2019 | Van Kleef ................ | F21V 15/01 |
| D898,864 | S * | 10/2020 | Qiu .............................. | D22/123 |
| D906,474 | S * | 12/2020 | Feng ........................... | D22/123 |
| 10,905,111 | B2 * | 2/2021 | Zhang .................... | F04D 29/644 |
| 11,603,970 | B1 * | 3/2023 | Rajasekaran ........... | A01M 1/04 |

(Continued)

FOREIGN PATENT DOCUMENTS

CN 109169569 A * 1/2019 ............. A01M 1/04
CN 109984108 A * 7/2019

(Continued)

OTHER PUBLICATIONS

CN-109169569-A Translation (Year: 2019).*
CN-112088851-A Translation (Year: 2020).*
CN-215123510-U Translation (Year: 2021).*

Primary Examiner — Darren W Ark
Assistant Examiner — Katelyn T Truong
(74) *Attorney, Agent, or Firm* — Daniel M. Cohn; Howard M. Cohn

(57) ABSTRACT

A bug zapper includes a housing assembly, a bug killing assembly, an LED circuit board, and a collection box. The housing assembly includes a main housing and a base. The main housing defines an accommodating space therein. Through holes communicated with the accommodating space are defined on the main housing. The base is annularly disposed and defines a central through hole and is connected to a bottom portion of the main housing. The base defines an inner side surface facing the central through hole. The bug killing assembly is disposed in the accommodating space. The LED circuit board is disposed on the base. The collection box is detachably mounted on the inner side surface of the base. The collection box defines a collection cavity disposed below the bug killing assembly. The bug zapper is able to illuminate while killing bugs.

20 Claims, 9 Drawing Sheets

(56) References Cited

U.S. PATENT DOCUMENTS

| | | | | |
|---|---|---|---|---|
| 2004/0159040 A1* | 8/2004 | Chen | ...................... | A01M 1/223 |
| | | | | 43/112 |
| 2017/0071184 A1* | 3/2017 | Zheng | ...................... | H05C 1/06 |
| 2018/0199563 A1* | 7/2018 | Zheng | ................... | A01M 1/106 |

FOREIGN PATENT DOCUMENTS

| | | | | |
|---|---|---|---|---|
| CN | 112088851 A | * | 12/2020 | .............. A01M 1/02 |
| CN | 215123510 U | * | 12/2021 | ............ A01M 1/023 |

* cited by examiner

BUG ZAPPER

TECHNICAL FIELD

The present disclosure relates to a technical field of insect zappers, and in particular to a bug zapper.

BACKGROUND

In the prior art, a lighting device is generally disposed on a bottom portion of a bug zapper, so that the bug zapper is able to illuminate while killing bugs, thus improving a use experience of the bug zapper.

However, in the bug zapper that has the lighting device, the lighting device is generally integrated with a main body of the bug zapper. Therefore, the bugs, such as mosquitoes, killed by the bug zapper are accumulated at the bottom portion of the bug zapper and are difficult to clean, which brings inconvenience to a user.

SUMMARY

Embodiments of the present disclosure provide a bug zapper that is able to illuminate while killing bugs and facilitates removal of dead bugs in the bug zapper.

The bug zapper comprises a housing assembly, a bug killing assembly, a light emitted diode (LED) circuit board, and a collection box.

The housing assembly comprises a main housing and a base. The main housing defines an accommodating space therein. Through holes communicated with the accommodating space are defined on the main housing. The base is annularly disposed and defines a central through hole. The base is connected to a bottom portion of the main housing. The base defines an inner side surface facing the central through hole; the bug killing assembly is disposed in the accommodating space. The LED circuit board is disposed on the base. The collection box is detachably mounted on the inner side surface of the base. The collection box defines a collection cavity disposed below the bug killing assembly.

In one optional embodiment, the base comprises positioning structures. The collection box comprises limiting structures. The limiting structures are respectively snapped with the positioning structures. Alternatively, the base comprises at least one first connecting hole. The collection box comprises at least one second connecting hole. The at least one first connecting hole is connected to the at least one second connecting hole through at least one fastening piece to connect the base with the collection box. Alternatively, the base is screwed with the collection box.

In one optional embodiment, the positioning structures are clamping grooves defined on the inner side surface of the base. The clamping grooves extend in a horizontal direction, and an opening is defined in one end of each of the clamping grooves. The limiting structures are protrusions disposed on an outer wall surface of the collection box. Each of the protrusions passes through a corresponding opening and is slidably disposed in a corresponding one of the clamping grooves.

In one optional embodiment, a twisting handle is disposed on a bottom portion of the collection box. The collection box is rotated in the horizontal direction through the twisting handle.

In one optional embodiment, the bottom portion of the collection box is recessed to define a first groove. The first groove extends toward the collection cavity. The twisting handle is disposed in the first groove.

In one optional embodiment, the base comprises a base body and an annular lampshade. The base body is connected to a bottom portion of the main housing. The annular lampshade defines an accommodating groove disposed toward the main housing. The annular lampshade is connected to a bottom portion of the base body. The annular lampshade is enclosed with the base body in a vertical direction to form a mounting cavity. The LED circuit board is mounted in the mounting cavity.

In one optional embodiment, the bug zapper further comprises a sealing ring disposed between the base body and the annular lampshade. Two opposite sides of the sealing ring respectively abut against the base body and the annular lampshade, and/or the annular lampshade is made from translucent material.

In one optional embodiment, a light-emitting direction of the LED circuit board is downward. The bug zapper further comprises a hook connected to a top portion of the housing assembly.

In one optional embodiment, the bug killing assembly comprises a lamp tube and a power grid. The lamp tube is disposed in the accommodating space. The power grid is disposed in the accommodating space and surrounds an outer periphery of the lamp tube.

In one optional embodiment, the housing assembly further comprises a first bracket. The main housing defines the accommodating space and the through holes. The first bracket is disposed on a top portion of the main housing.

A first mounting groove and a mounting portion are disposed on a bottom portion of the first bracket. A lamp holder of the lamp tube is embedded in the first mounting groove. The power grid is sleeved on an outer peripheral surface of the mounting portion.

In one optional embodiment, the bug zapper further comprises a control assembly. The control assembly is disposed on the housing assembly and is disposed above the bug killing assembly. The first bracket comprises a wiring hole. A wire of the lamp tube and a wire of the power grid pass through the wiring hole and are electrically connected to the control assembly.

In one optional embodiment, the housing assembly further comprises a second bracket. The second bracket is connected to the inner side surface of the base and is disposed in the central through hole. The second bracket is located below the lamp tube and the power grid. A second mounting groove is defined on a top portion of the second bracket. A bottom portion of the lamp tube is disposed in the second mounting groove. The second bracket defines first holes communicating the accommodating space with the collection cavity.

In one optional embodiment, the base further comprises a fixing portion connected to the inner side surface of the base. The fixing portion is disposed in the central through hole. The fixing portion is fixedly connected to the second bracket. A fixing groove is defined on a top portion of the fixing portion. A bottom portion of the power grid contacts a bottom wall of the fixing groove. The fixing portion defines second holes communicating the accommodating space with the collection cavity.

In one optional embodiment, the bug zapper further comprises a control assembly. The control assembly is disposed on the housing assembly and is disposed above the bug killing assembly. The bug killing assembly and the LED circuit board are controlled by the control assembly.

In one optional embodiment, the housing assembly further comprises a top cover and a first bracket. The first bracket is disposed on a top portion of the main housing. The top cover is disposed on a top portion of the first bracket. The top cover is enclosed with the first bracket to define a mounting space. The control assembly is mounted in the mounting space.

In one optional embodiment, the main housing further comprises first ribs extending in a vertical direction. A wiring channel is defined inside the first ribs. A first wire hole is defined on the base to communicate a mounting cavity of the base with an outside. A second wire hole is defined on the first bracket to communicate the mounting space with the outside. A conductive wire of the LED circuit board passes through the first wire hole and the wiring channel, extends to the top portion of the main housing, and passes through the second wire hole to be electrically connected to the control assembly.

In one optional embodiment, the main housing comprises a first housing and a second housing. Both the first housing and the second housing comprise the first ribs. Second grooves are defined on side surfaces of the first ribs. The first housing is fastened to the second housing in a horizontal direction to form the wiring channel.

In one optional embodiment, first connecting columns are disposed on two sides of the first housing. Second connecting columns are disposed on two sides of the second housing. A first mounting hole is defined on each of the first connecting columns, and a second mounting hole is defined on each of the second connecting columns. Each first mounting hole is connected to a corresponding second mounting hole through a connecting piece, so that the first housing is connected to the second housing.

In one optional embodiment, the main housing further comprises second ribs extending in a horizontal direction. The first ribs and the second ribs are connected to define the through holes.

In one optional embodiment, the control assembly comprises a control circuit board and a control switch. The bug killing assembly and the LED circuit board are electrically connected to the control circuit board. The control switch is configured to control a working state of the control circuit board.

In the bug zapper of the embodiments of the present disclosure, positions of the bug killing assembly, the LED circuit board, and the collection box disposed in the housing assembly are reasonably designed, so that the bug killing assembly, the LED circuit board, and the collection box do not interfere with each other. The bug zapper of the present disclosure is able to illuminate while killing the bugs, and facilitates removal of dead bugs, such as dead mosquitoes, in the collection cavity. The collection box and the base are detachably connected, so there is no need to disassemble all of the insect zapper when removing the dead mosquitoes, which brings great convenience to a user.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

Figure 1:
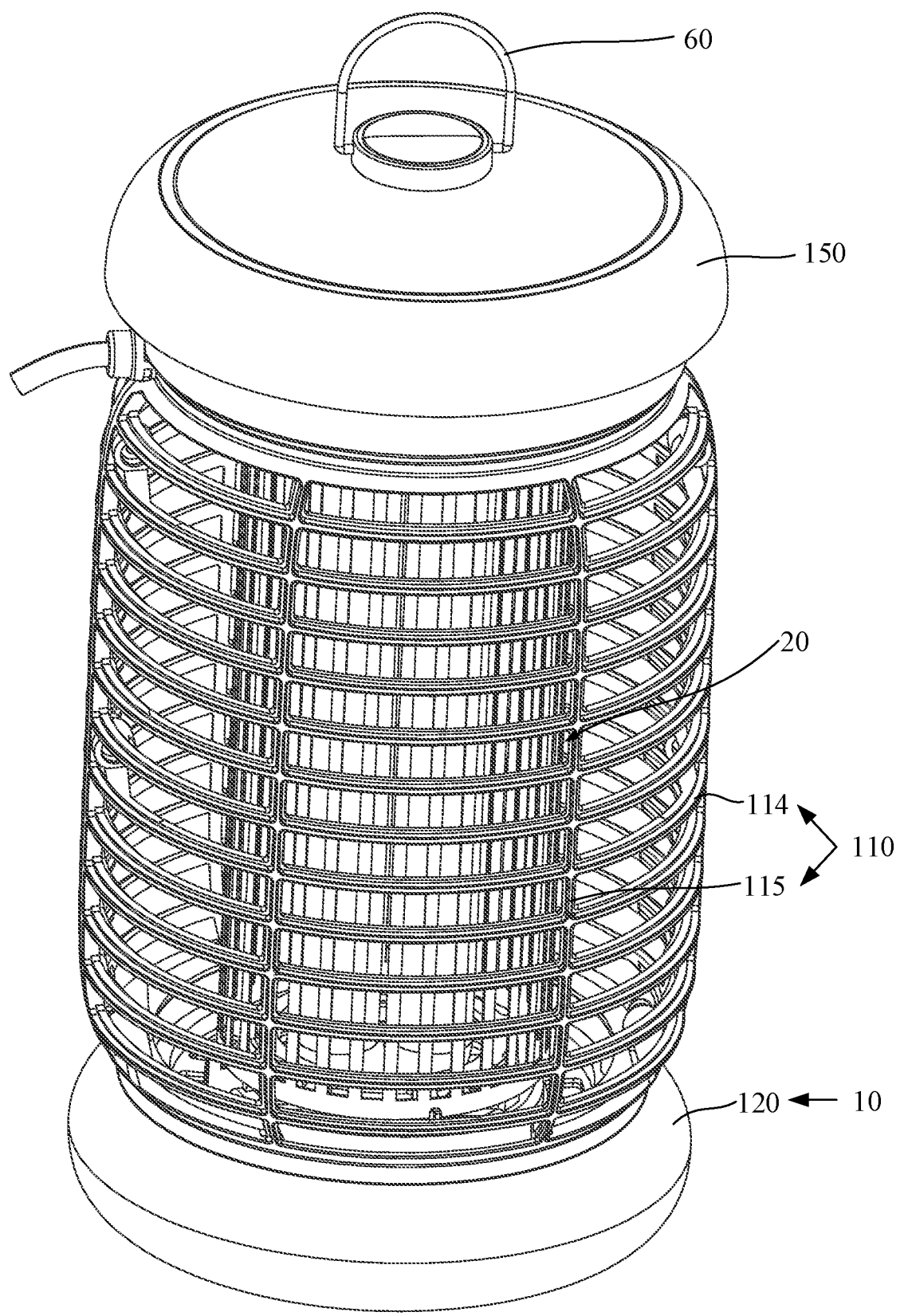
FIG. 1 is a schematic diagram of a bug zapper according to a first embodiment of the present disclosure.

In the drawings:
10—housing assembly; 110—main housing; 111—first housing; 112—second housing; 113—first rib; 114—second rib; 115—wiring channel; 115s—second groove; 120—base; 121—base body; 1211—fixing portion; 1212—second hole; 1213—fixing groove; 122—annular lampshade; 123—mounting cavity; 124—clamping groove; 130—first bracket; 131—first mounting groove; 132—mounting portion; 140—second bracket; 141—second mounting groove; 142—first hole; 150—top cover; 160—mounting space; 20—bug killing assembly; 21—lamp tube; 22—power grid; 30—LED circuit board; 31—conductive wire; 40—control assembly; 41—control circuit board; 42—control switch; 50—collection box; 51—collection cavity; 52—protrusion; 53—twisting handle; 54—first groove; 60—hook.

Realization of purposes, functional features, and advantages of the present disclosure is further described with reference to the embodiments and the accompanying drawings.

DETAILED DESCRIPTION

In order to make the purpose, technical solutions, and advantages of the present disclosure clear, the following section will further describe the embodiments of the present disclosure in detail with reference to the accompanying drawings.

When the following description refers to the drawings, the same numbers in different drawings refer to the same or similar elements unless otherwise indicated. The implementations described in the following exemplary embodiments do not represent all implementations consistent with the present disclosure. Rather, they are merely examples of apparatus and methods consistent with certain aspects of the present disclosure, as detailed in the appended claims.

It should be understood in the description of the present disclosure that terms such as "first" and "second" are only used for the purpose of description, rather than being understood to indicate or imply relative importance or hint the number of indicated technical features. Thus, the feature limited by "first" and "second" can explicitly or impliedly include at least one feature. Unless otherwise indicated, the term "a plurality of" means two or more. The term "and/or" depict relationship between associated objects and there are three relationships thereon. For example, A and/or B may indicate A exists alone, A and B exist at the same time, and B exists alone. The character "/" generally indicates that the associated object is alternative. The terms "first", "second", "third", etc. in the present disclosure are used only to distinguish similar objects and do not imply a specific ordering of objects.

Unless otherwise defined, all technical and scientific terms used herein have the same meaning as commonly understood by those skilled in the art of the present disclosure. The terminology used in the specification is for the purpose of describing specific embodiments only and is not intended to limit the present disclosure. As used herein, the term "and/or" includes any and all combinations of one or more of the associated listed items.

Figure 2:
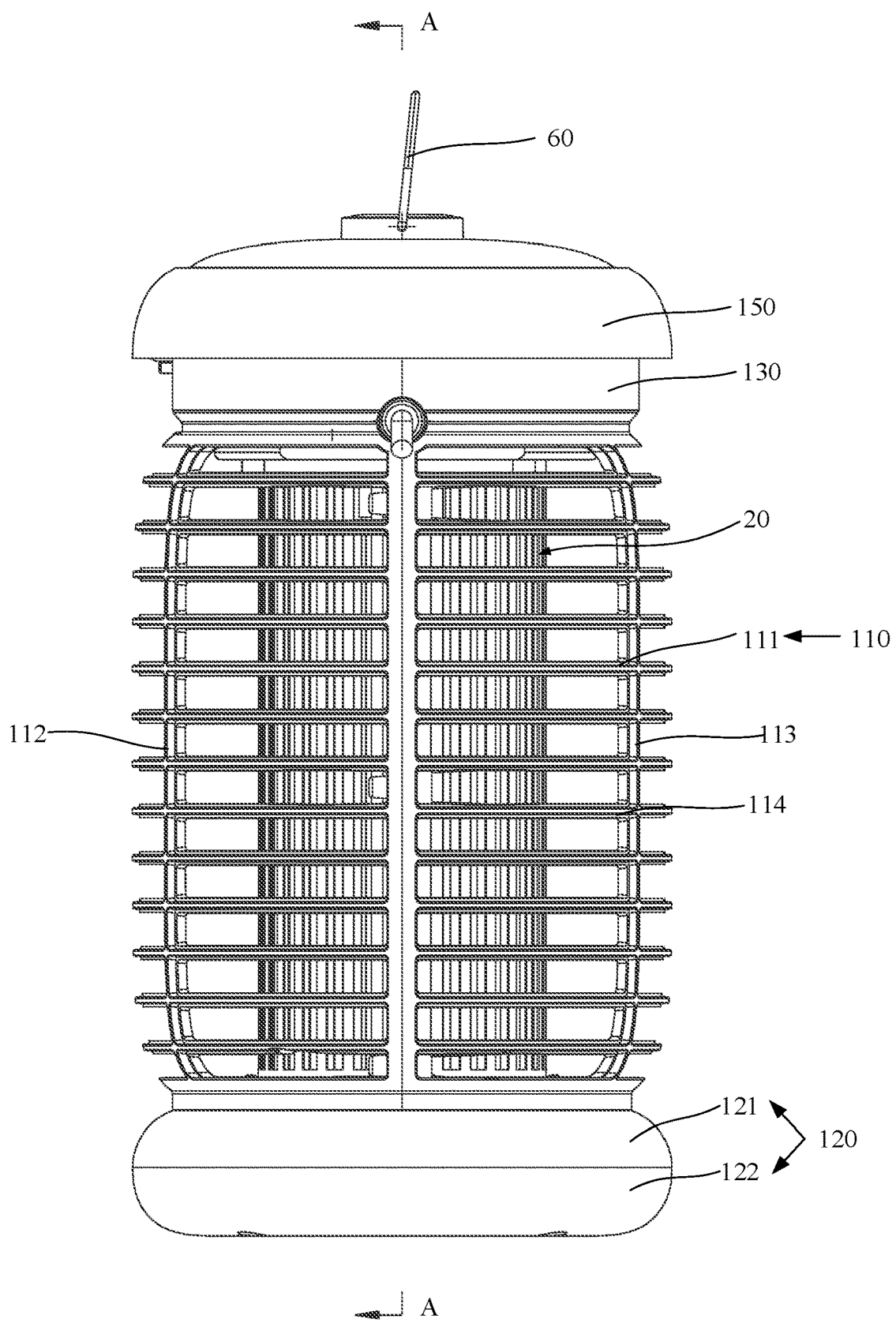
FIG. 2 is a front side schematic diagram of the bug zapper according to the first embodiment of the present disclosure.
Figure 3:
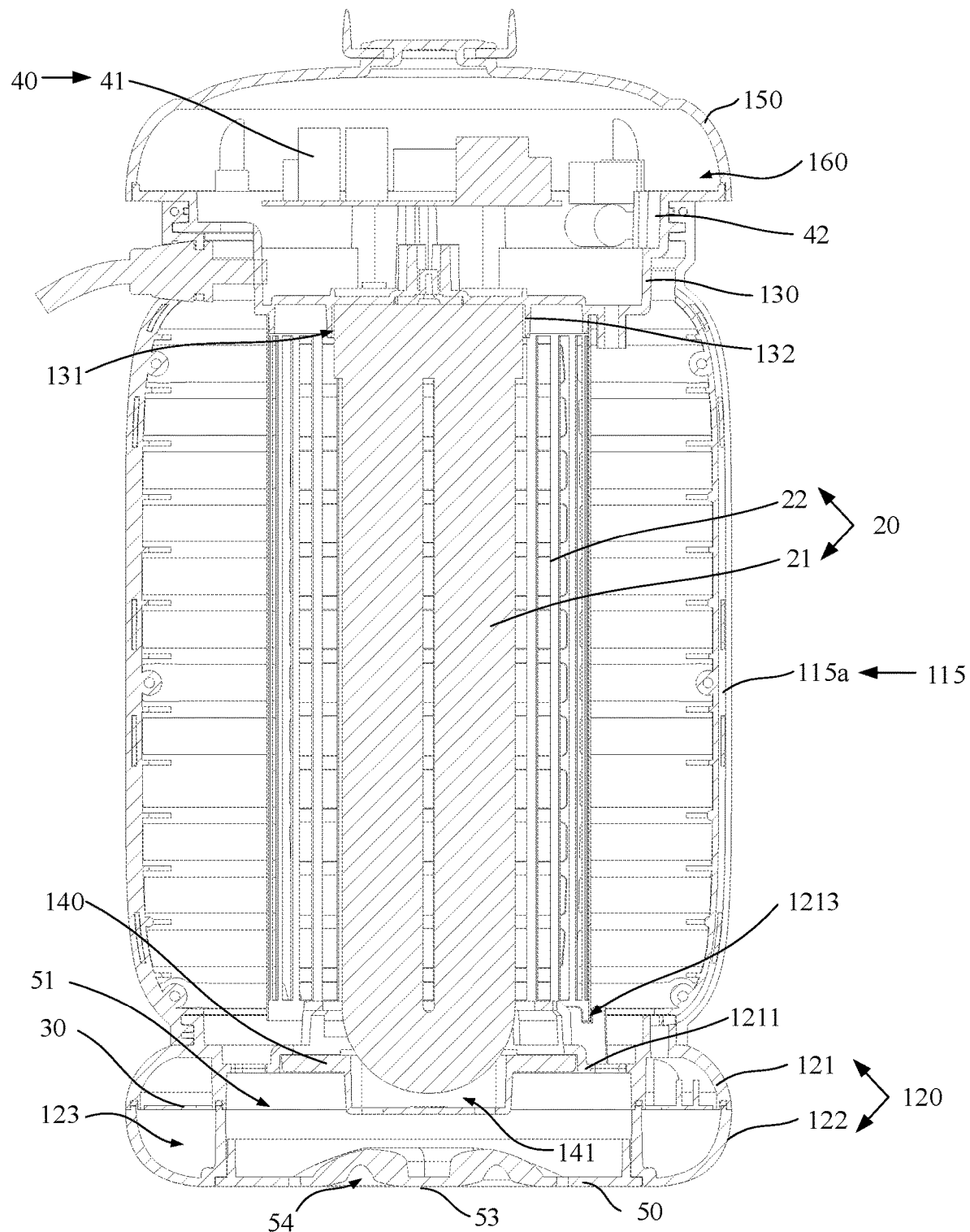
FIG. 3 is a cross-sectional schematic diagram of the bug zapper taken along a line A-A shown in FIG. 2.

As shown in FIGS. 1-3, the present disclosure provides a bug zapper. The bug zapper comprises a housing assembly 10, a bug killing assembly 20, a light emitted diode (LED) circuit board 30, a control assembly 40, and a collection box 50.

The housing assembly 10 comprises a main housing 110 and a base 120. The main housing 110 defines an accommodating space therein. Through holes communicated with the accommodating space are defined on the main housing 110. The main housing 110 comprises first ribs extending in a vertical direction and second ribs 113 extending in a horizontal direction. The first ribs 113 and the second ribs 114s are connected to define the through holes. It is understood that bugs, such as mosquitoes, are allowed to enter the accommodating space through the through holes, and thus being killed by the bug killing assembly 20.

As shown in FIGS. 1-8, it should be noted that the main housing 110 is in a cylindrical shape, a rhombus shape, a spherical shape, etc., which is not specifically limited thereto.

The base 120 is disposed on a bottom portion of the main housing 110 and defines a central through hole at a central position thereof. The base 120 is an annular structure. The base 120 may be in a shape of a circular ring. Of course, according to actual needs, the base 120 may also be in a shape of a square ring, etc. The central through hole may be a circular hole, a square hole, etc. The base 120 defines an inner side surface facing the central through hole.

As shown in FIG. 3, the bug killing assembly 20 is disposed in the accommodating space. The bug killing assembly 20 comprises a trapping device and a power grid 22. In one embodiment, the trapping device is a lamp tube 21. The power grid 22 surrounds an outer periphery of the lamp tube 21.

The mosquitoes have phototaxis, so the lamp tube is capable if attracting the mosquitoes. When the mosquitoes pass through the power grid 22, the mosquitoes are killed by the power grid 22. In some other embodiments, the trapping device is a device emitting sound waves to attract the mosquitoes, a device generating carbon dioxide, or a device generating other special gas (such as ethanol, pentanone, etc.). It is understood that the device generating carbon dioxide is configured to simulate the carbon dioxide exhaled by a person, so that the mosquitoes are attracted. The device generating special gas is configured to simulate a smell emitted by the skin of the person, so that the mosquitoes are attracted. A specific form of the bug killing assembly 20 is not limited thereto.

Figure 4:
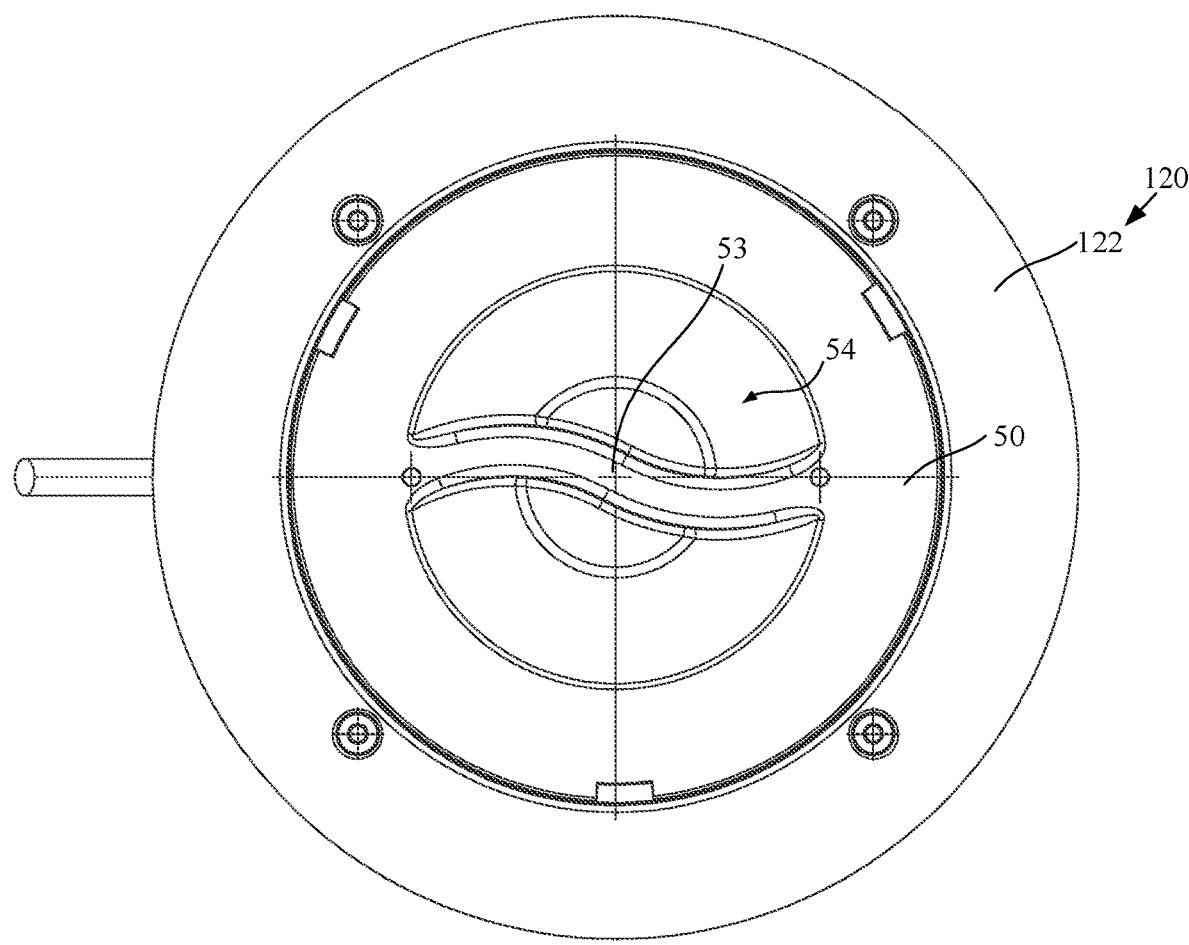
FIG. 4 is an exploded schematic diagram of the bug zapper according to the first embodiment of the present disclosure.
Figure 9:
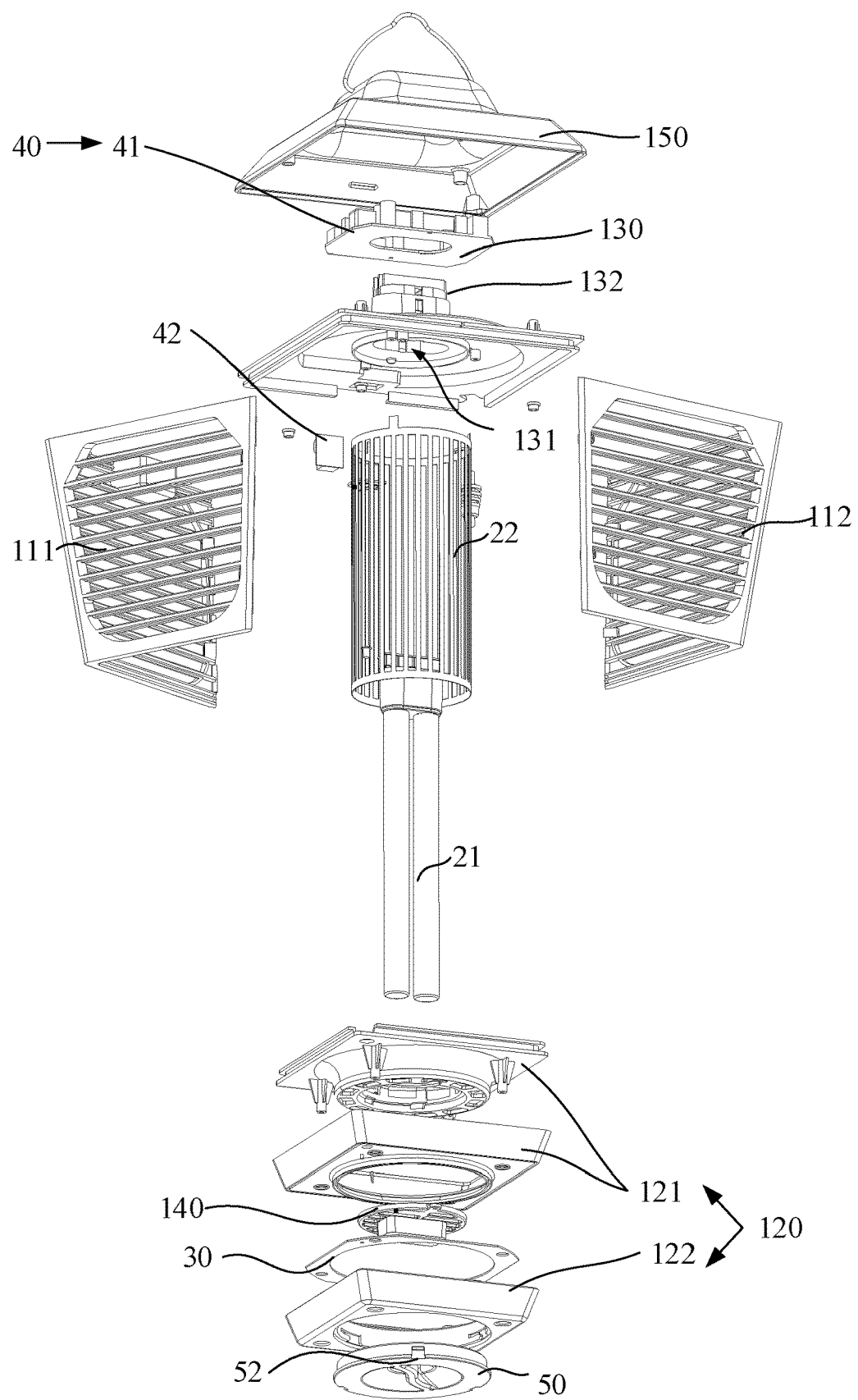
FIG. 9 is an exploded schematic diagram of the bug zapper according to the second embodiment of the present disclosure.

As shown in FIGS. 3, 4, and 9, in order to facilitate mounting of the bug zapper, the housing assembly 10 further comprises a first bracket 130. The first bracket 130 is disposed on a top portion of the main housing 110. A first mounting groove 131 and a mounting portion 132 are disposed on a bottom portion of the first bracket 130. A lamp holder of the lamp tube 21 is embedded in the first mounting groove 131. The power grid 22 is sleeved on an outer peripheral surface of the mounting portion 132. The first bracket 130 is mounted on the top portion of the main housing 110 as a supporting structure, which provides stable support to ensure that the lamp tube 21 and the power grid 22 are mounted in appropriate positions to prevent the lamp tube 21 and the power grid 22 from being shaken or unstable and affecting normal use of the bug zapper. The lamp holder of the lamp tube 21 is embedded in the first mounting groove 131, which makes a mounting of the lamp tube 21 convenient and fast, while ensuring an accurate mounting position of the lamp tube 21, and improving assembly efficiency and quality of the bug zapper. The power grid 22 is sleeved on the outer peripheral surface of the mounting portion 132, so that the power grid 22 is firmly fixed on the main housing 110, preventing the power grid 22 from shifting or shaking, and improving the stability and safety of the bug zapper.

Furthermore, as shown in FIGS. 3, 4, and 9, the housing assembly 10 further comprises a second bracket 140. The second bracket 140 is connected to the inner side surface of the base 120 and is disposed in the central through hole. The second bracket 140 is located below the lamp tube 21 and the power grid 22. A second mounting groove 140 is defined on a top portion of the second bracket 140. A bottom portion of the lamp tube 21 is disposed in the second mounting groove 140. The second bracket 140 defines first holes 142 communicating the accommodating space with the collection cavity 51. By such arrangement, the bottom portion of the lamp tube 21 contacts a bottom wall of the second mounting groove 141, so that the lamp tube 21 is more firmly fixed in the accurate mounting position, preventing the lamp tube 21 from shifting or shaking, and improving stability and safety of the bug zapper. Moreover, the bugs killed by the bug killing assembly 20 may fall into the collection cavity 51 through the first holes 142, so as to facilitate a collection of the dead bugs and thus keeping the bug zapper clean.

Furthermore, as shown in FIG. 3, a fixing groove 1213 is defined on the base 120. A bottom portion of the power grid 22 contacts a bottom wall of the fixing groove 1213, so that the power grid 22 is firmly fixed and is prevented from shifting or shaking, which protects the user when carrying the bug zapper and improves reliability of the bug zapper.

As shown in FIG. 3, in order to facilitate mounting of the second bracket 140 on the base 120, the base 120 further comprises a fixing portion 1211 connected to the inner side surface of the base 120. The fixing portion 1211 is disposed in the central through hole. The fixing portion 1211 is fixedly connected to the second bracket 140. The fixing portion 1211 and the second bracket 140 are connected by screwing, bonding, snapping, etc., which is not specifically limited thereto.

Specifically, the fixing portion 1211 defines second holes 1212 communicating the accommodating space with the collection cavity 51. In this way, the bugs killed by the bug killing assembly 20 may fall into the collection cavity 51 through the second holes 1212, so as to keep the bug zapper clean.

The LED circuit board 30 is disposed on the base 120. In order to facilitates mounting of the LED circuit board on the base 120, as shown in FIG. 3, in one embodiment, the base 120 comprises a base body 121 and an annular lampshade 122. The base body 121 is connected to the bottom portion of the main housing 110. The base body 121 and the main housing 110 are connected by screwing, bonding, snapping, etc., which is not specifically limited thereto. The annular lampshade 122 defines an accommodating groove disposed toward the main housing 110. The annular lampshade 122 is connected to a bottom portion of the base body 121. The annular lampshade 122 is enclosed with the base body 121 in the vertical direction to form the mounting cavity 123. The LED circuit board 30 is mounted in the mounting cavity 123. The base body 121 and the annular lampshade 122 are connected by screwing, bonding, snapping, etc., which is not specifically limited thereto. The LED circuit board 30 is disposed in the mounting cavity 123.

Furthermore, the annular lampshade 122 is made from translucent material, such as acrylic, polyvinyl chloride (PVC), fabric, fiberglass, etc., which creates a soft lighting effect and prevents emitted light from being too dazzling.

The fixing portion is connected to the inner side surface of the base body 121.

Furthermore, as shown in FIGS. 3 and 4, the bug zapper further comprises a sealing ring (not labeled) disposed between the base body 121 and the annular lampshade 122. Two opposite sides of the sealing ring respectively abut against the base body 121 and the annular lampshade 122. In this way, sealing performance of the mounting cavity is improved, which improves service life of the LED circuit board 30.

In one optional embodiment, a light-emitting direction of the LED circuit board 30 is downward. The bug zapper further comprises a hook 60 connected to a top portion of the housing assembly 10. The annular lampshade 122 is enclosed with the base body 121 in the vertical direction to form a mounting cavity 123, and the LED circuit board is clamped in the mounting cavity 123. In this way, the mounting efficiency of the base body 121 and the annular lampshade 122 is improved. Since the annular lampshade 122 is disposed below the LED circuit board 30, setting the light-emitting direction of the LED circuit board 30 downward improves a lighting brightness of the bug zapper. In some other embodiments, the light-emitting direction of the LED circuit board 30 is toward other directions, such as the horizontal direction, which is not limited thereto.

Furthermore, the bug zapper further comprises a hook 60 connected to the top portion of the housing assembly 10. Therefore, the bug zapper is capable of being hung on a desired position, such as indoor, outdoor, or open-air spaces, which provides more placement options and increases a convenience of use. Moreover, by arrangement of the hook 60, the user is allowed to move or change the position of the bug zapper at any time as needed, rather than fixing the bug zapper at a fixed position, which improves usage flexibility and applicability.

As shown in FIG. 3, the control assembly 40 is disposed on the housing assembly 10 and is disposed above the bug killing assembly 20. In one optional embodiment, the control assembly 40 comprises a control circuit board 41 and a control switch 42. The bug killing assembly 20 and the LED circuit board 30 are electrically connected to the control circuit board 41. The control switch 42 is configured to control a working state of the control circuit board 41. The control switch 42 is mounted on tan outer surface of the housing assembly 10, so that the user can easily control the working state of the control circuit board 41 through the control switch 42, and realize operations of the bug killing assembly 20 and the LED circuit board 30, which provides a convenience usage experience.

Furthermore, the first bracket 130 comprises a wiring hole. A wire of the lamp tube 21 and a wire of the power grid 22 pass through the wiring hole and are electrically connected to the control assembly 40.

In one optional embodiment, to facilitate mounting of the control assembly 40, as shown in FIG. 3, the housing assembly 10 further comprises a top cover 150 The top cover 150 is disposed on a top portion of the first bracket 130. The top cover 150 is enclosed with the first bracket 130 to define a mounting space 160. The control assembly 40 is mounted in the mounting space 160, so that the control assembly 40 is effectively protected from influence, such as dust, water vapor, etc., of the external environment, thereby reducing a risk of damage to the control assembly 40 and extending the service life thereof. Moreover, the top cover 150 is mounted and connected to the first bracket 130, making the housing assembly 10 beautiful in appearance.

In order to facilitate an electrical connection between the LED circuit board 30 and the control circuit board 41, a wiring channel 115 is defined inside the first ribs 113. A first wire hole is defined on the base 120 to communicate the mounting cavity 123 of the base 120 with an outside. A second wire hole is defined on the first bracket 130 to communicate the mounting space with the outside. A conductive wire 31 of the LED circuit board 30 passes through the first wire hole and the wiring channel 115, extends to the top portion of the main housing 110, and passes through the second wire hole to be electrically connected to the control assembly 40.

In this way, a wire layout is orderly and tidy, which avoids entanglement and confusion of wires and facilitates maintenance and management of the wires. Moreover, the wiring channel 115 effectively protects the conductive wire 31 of the LED circuit board 30, reduces damage or interference caused by external factors, improves the safety and stability of the conductive wire, and extends service life of the conductive wire.

In order to facilitate wiring of the conductive wire 31 of the LED circuit board 30 in the wiring channel 115, in one optional embodiment, as shown in FIGS. 3, 4, and 9, the main housing 110 comprises a first housing 111 and a second housing 112. Both the first housing 111 and the second housing 112 comprise the first ribs 113. second grooves 115a are defined on side surfaces of the first ribs 113 at two sides of the first housing 111 and two sides of the second housing 112. The first housing 111 is fastened to the second housing 112 in the horizontal direction to form the wiring channel 115. When assembling, First, the conductive wire 31 of the LED circuit board 30 is embedded in the second grooves 115a on one of the first housing 111 and the second housing 112, and then the first housing 111 and the second housing 112 are fastened and fixed in the horizontal direction, so that the conductive wire 31 of the LED circuit board 30 is fixed in the wiring channel 115.

In order to facilitate mounting of the first housing 111 and the second housing 112, first connecting columns are disposed on two sides of the first housing 111. Second connecting columns are disposed on two sides of the second housing 112. A first mounting hole is defined on each of the first connecting columns, and a second mounting hole is defined on each of the second connecting columns. Each first mounting hole is connected to a corresponding second mounting hole through a connecting piece, so that the first housing 111 is connected to the second housing 112. In this way, a mounting operation is simple, and stability of the main housing 110 is good.

As shown in FIG. 3, the collection box 50 is detachably mounted on the inner side surface of the base and defines the collection cavity 51 located below the bug killing assembly 20. By such arrangement, the collection box 50 is capable of being easily removed, making it convenient to remove the dead bugs in the collection cavity 51. Therefore, the bug zapper is clean and hygienic and problems of odor or hygiene issues caused by an excessive accumulation of the dead bugs are avoided.

In summary, in the bug zapper of the embodiments of the present disclosure, positions of the bug killing assembly 20, the LED circuit board 30, and the collection box 50 disposed in the housing assembly 10 are reasonably designed, so that the bug killing assembly 20, the LED circuit board 30, and the collection box 50 do not interfere with each other. The bug zapper of the present disclosure is able to illuminate while killing the bugs, and facilitates removal of dead bugs, such as dead mosquitoes, in the collection cavity 51. The collection box 50 and the base 120 are detachably connected, so there is no need to disassemble all of the insect zapper when removing the dead bugs, which brings great convenience to the user.

The collection box 50 is detachably connected to the base 120 in many ways, which are illustrated as follow.

In one optional embodiment, the base 120 comprises positioning structures. The collection box 50 comprises limiting structures. The limiting structures are respectively snapped with the positioning structures.

Figure 6:
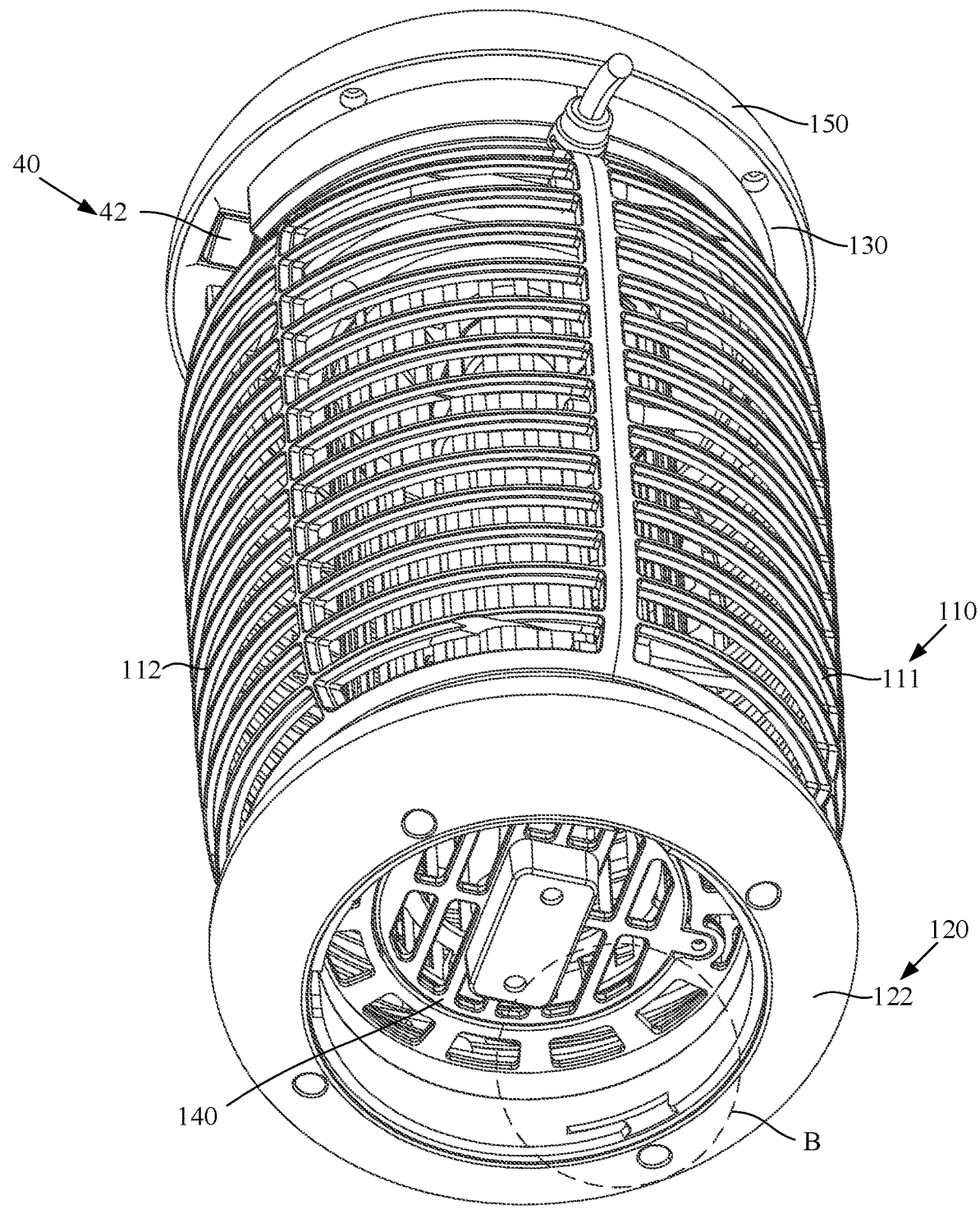
FIG. 6 is a schematic diagram of the bug zapper according to the first embodiment of the present disclosure where a collection box is removed.
Figure 7:
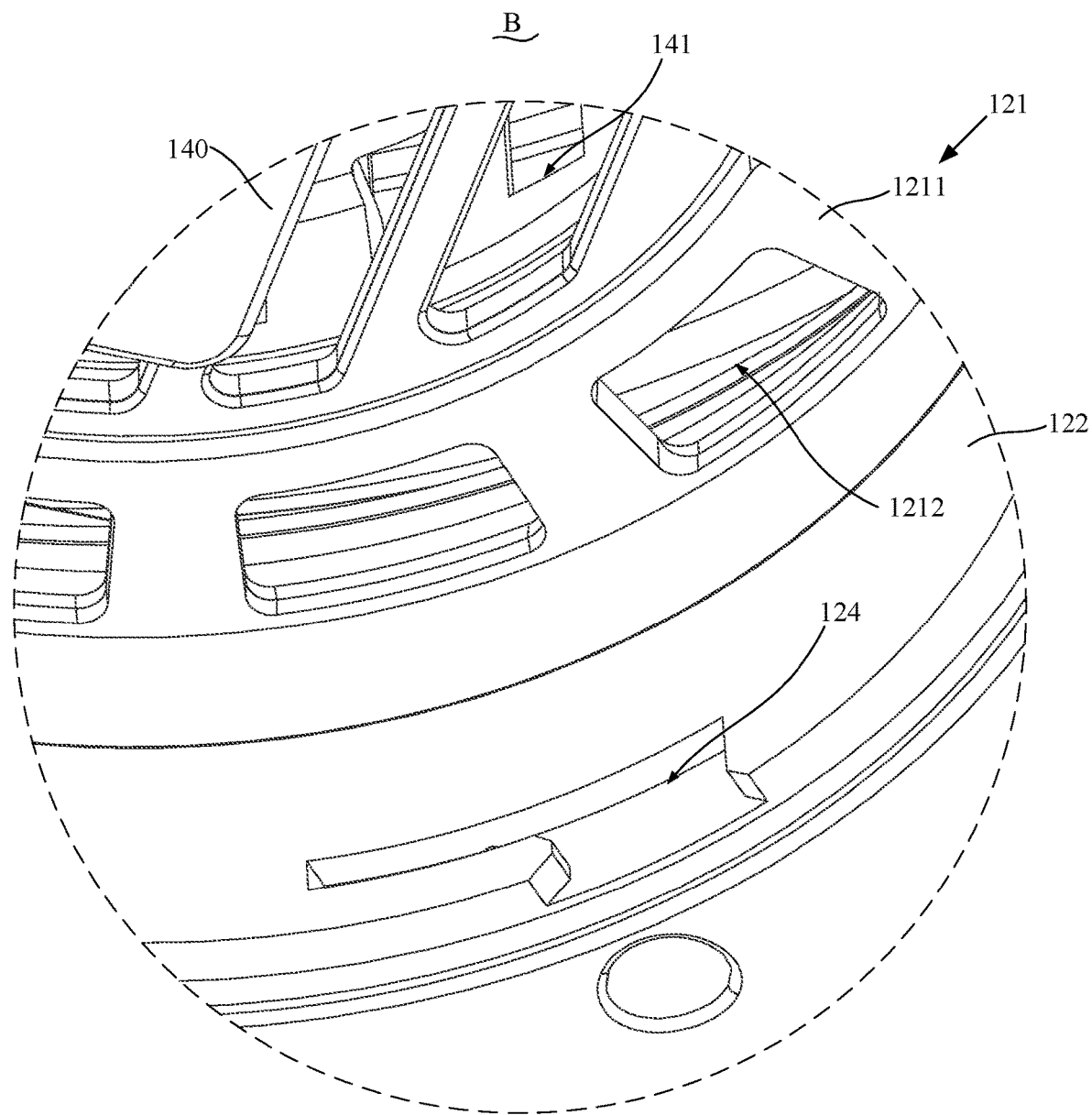
FIG. 7 is an enlarged schematic diagram of portion B shown in FIG. 6.
Figure 8:
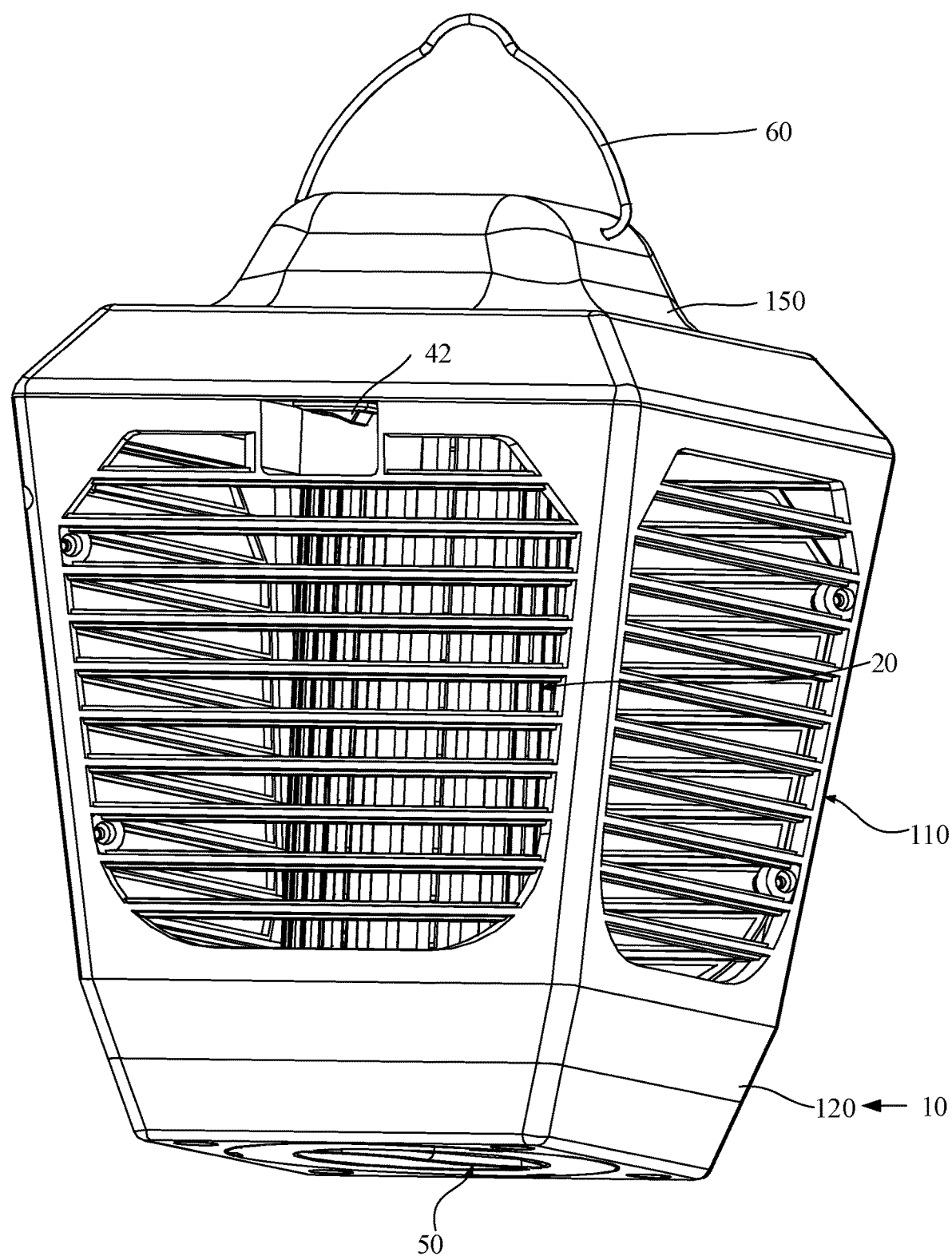
FIG. 8 is a schematic diagram of the bug zapper according to a second embodiment of the present disclosure.

As shown in FIGS. 6 and 7, the positioning structures are clamping grooves 124 defined on the inner side surface of the base 120. The clamping grooves 124 extend in the horizontal direction, and an opening is defined in one end of each of the clamping grooves 124. The limiting structures are protrusions 52 disposed on an outer wall surface of the collection box 50. Each of the protrusions 52 passes through a corresponding opening and is slidably disposed in a corresponding one of the clamping grooves 124.

Specifically, the collection box 50 is pressed into the central through hole in the vertical direction, and at this time, each of the protrusions 52 inserts into the corresponding one of the clamping grooves 124 through the corresponding opening. Then, the collection box 50 is rotated in the horizontal direction, and at this time, each of the protrusions 52 slides in the corresponding one of the clamping grooves 124. When each of the protrusions 52 is not aligned with the corresponding opening in the vertical direction, each of the protrusions 52 is relatively fixed in the corresponding one of the clamping grooves 124, so that the collection box 50 is fixed on the base 120. When each of the protrusions 52 slides in the corresponding one of the clamping grooves 124 and is aligned with the corresponding opening in the vertical direction, the collection box 50 is allowed to be detached from the base 120. Alternatively, the positioning structures are the protrusions 52, and the limiting structures are the clamping grooves 124.

In some other embodiments, the positioning structures are buckled, and the limiting structures are the clamping grooves 124 The buckles are one-to-one fastened in the clamping grooves 124 to fix the collection box 50 on the base 120. When the buckles are disengaged from the clamping grooves 124, the collection box 50 is allowed to be detached from the base 120. The positioning structures and the limiting structures may also be protrusions that cooperate with each other, which are not limited thereto.

It should be noted that the positioning structures of the present disclosure are disposed on an inner side of the annular lampshade 122, which facilitates the user to align the positioning structures and the limiting structures.

In one alternative embodiment, the base 120 comprises at least one first connecting hole (not shown in the drawings). The collection box 50 comprises at least one second connecting hole (not shown in the drawings). The at least one first connecting hole is connected to the at least one second connecting hole through at least one fastening piece to connect the base 120 with the collection box 50. Specifically, the at least one fastening piece is inserted into the at least one first connecting hole and the at least one second connecting hole, so that the at least one first connecting hole is connected to the at least one second connecting hole. Such connecting method is simple to operate and has strong stability. When it is necessary to disassemble the collection box 50, just disassemble the at least one fastening piece. The at least one fastening piece may be a threaded piece such as a screw, a bolt, etc., which is not limited thereto.

In one alternative embodiment, the base 120 is screwed with the collection box 50, which makes a connection between the base 120 and the collection box 50 firm and stable, so that the collection box is not easy to loosen or fall off. Further, since the base 120 is screwed with the collection box 50, it is easy to unscrew the base 120 and the collection box 50. Therefore, the user can easily clean, replace, or maintain the collection box 50, which improves the convenience and flexibility of use.

In order to facilitate a rotation of the collection box in the horizontal direction and in order to facilitate the mounting and disassembly of the base 120 and the collection box 50, a twisting handle 53 is disposed on a bottom portion of the collection box 50. The user can easily open or close the collection box 50 by twisting the twisting handle 53 without tools, making an operation thereof convenient and quick.

Figure 5:
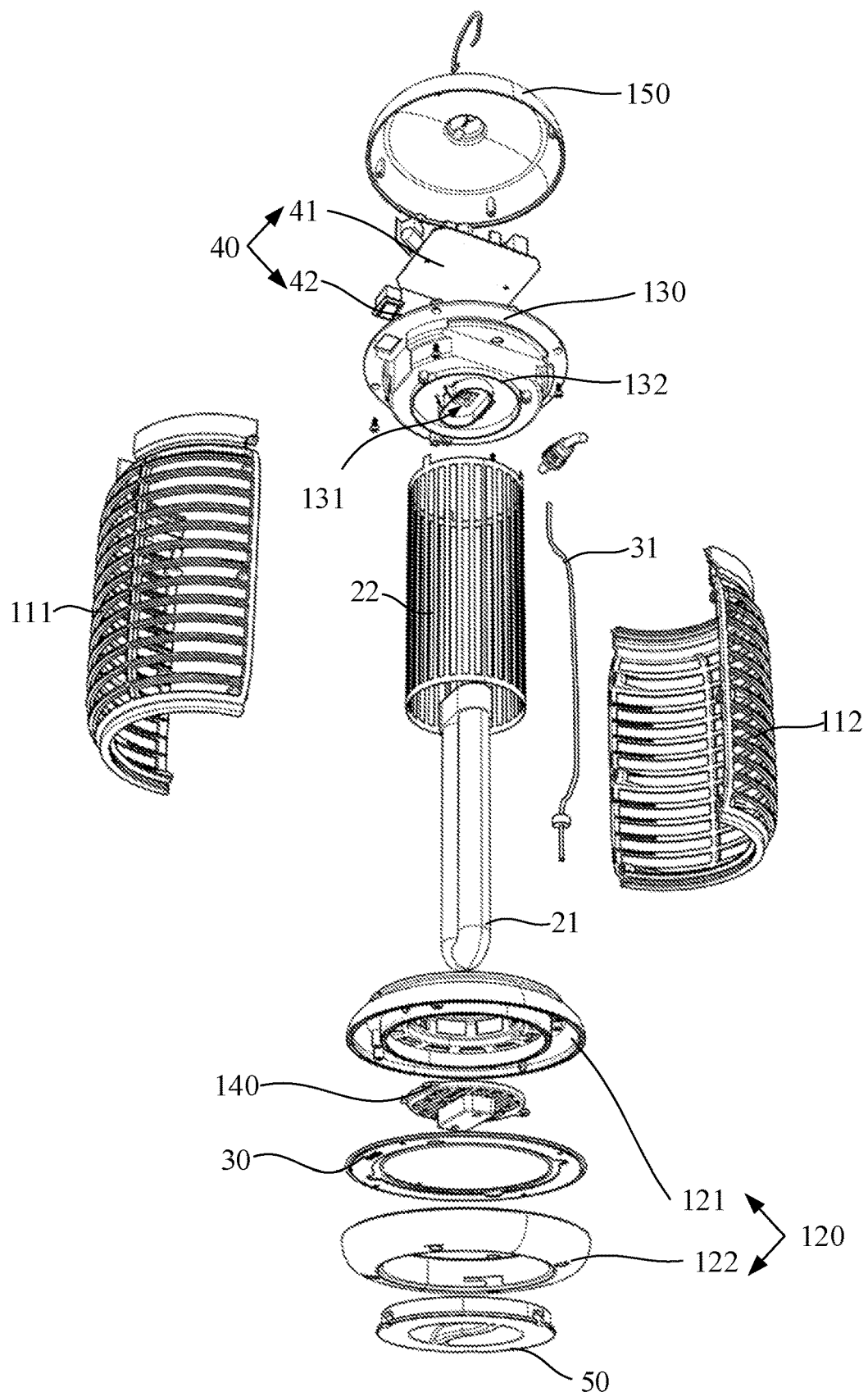
FIG. 5 is a top side schematic diagram of the bug zapper according to the first embodiment of the present disclosure.

Furthermore, as shown in FIGS. 3 and 5, the bottom portion of the collection box 50 is recessed to define a first groove 54. The first groove 54 extends toward the collection cavity 51. The twisting handle 53 is disposed in the first groove 54. The twisting handle 53 is disposed in the first groove 54, which effectively prevents accidental opening or closing of the collection box 50, improves safety of the bug zapper, and avoids accidents. Moreover, the twisting handle 53 is disposed in the first groove 54, which makes the bug zapper beautiful and elegant in appearance since the twisting handle 53 is not protruded from the collection box. Therefore, an overall design sense and practicality of the bug zapper is ensured.

In the drawings of the embodiments, the same or similar numbers correspond to the same or similar components; in the description of the present disclosure, it should be understood that terms such as "upper", "lower", "left", "right", etc. indicate direction or position relationships shown based on the drawings, and are only intended to facilitate the description of the present disclosure and the simplification of the description rather than to indicate or imply that the indicated device or element must have a specific direction or constructed and operated in a specific direction. Therefore, the terms used to describe positional relationships in the drawings are only for illustrative purposes and cannot be construed as limitations of the present disclosure. For those of ordinary skill in the art, the specific meanings of the above terms can be understood according to specific circumstances.

The above are only optional embodiments of the present disclosure and are not intended to limit the present disclosure. Any modifications, equivalent substitutions, and improvements made within the spirit and principles of the present disclosure shall be included in the protection scope of the present disclosure.

What is claimed is:
1. A bug zapper, comprising:
a housing assembly,
a bug killing assembly,
a light emitted diode (LED) circuit board, and a collection box;
wherein the housing assembly comprises a main housing and a base; the main housing defines an accommodating space therein; through holes communicated with the accommodating space are defined on the main housing; the base is connected to a bottom portion of the main housing; the base defines an inner side surface facing a central through hole; the bug killing assembly is disposed in the accommodating space; the collection box defines a collection cavity disposed below the bug killing assembly and communicated with the accommodating space; and the base is substantially ring-shaped; the base has a mounting cavity inside the base and has the central through hole that is dis-communicated with the mounting cavity and penetrates the base; the base has an inner side surface that faces towards the central through hole and faces away from the mounting cavity; the collection box is detachably mounted on the inner side surface of the base; the LED circuit board is disposed in the mounting cavity of the base and surrounds a periphery of the collection box;

the base further comprises a fixing portion connected to the inner side surface and disposed in the central through hole; the fixing portion defines a mounting hole disposed at a central part of the fixing portion and second holes disposed at intervals around a periphery of the mounting hole and each spaced apart from the mounting hole; each of the mounting hole and the second holes communicates the accommodating space with the collection cavity;

the housing assembly further comprises a second bracket; the second bracket is disposed in the mounting hole, and an outer peripheral wall of the second bracket is fixedly connected to an inner peripheral wall of the fixing portion defining the mounting hole; a second mounting groove is defined on a top portion of the second bracket; at least a part of the bug killing assembly is disposed in the second mounting groove; the second bracket defines first holes, all of the first holes are disposed at intervals around a periphery of the second mounting groove, and each of the first holes is spaced apart from the second mounting groove; the first holes communicate the accommodating space with the collection cavity.

2. The bug zapper according to claim 1, wherein the base comprises positioning structures; the collection box comprises limiting structures; the limiting structures are respectively mated with the positioning structures; or the base comprises at least one first connecting hole, the collection box comprises at least one second connecting hole, and the at least one first connecting hole is connected to the at least one second connecting hole through at least one protruding connecting piece to connect the base with the collection box.

3. The bug zapper according to claim 2, wherein the positioning structures are clamping grooves defined on the inner side surface of the base; the clamping grooves extend in a horizontal direction, and an opening is defined in one end of each of the clamping grooves; the limiting structures are protrusions disposed on an outer wall surface of the collection box; each of the protrusions passes through a corresponding opening and is slidably disposed in a corresponding one of the clamping grooves.

4. The bug zapper according to claim 3, wherein a twisting handle is disposed on a bottom portion of the collection box; the collection box is rotated in the horizontal direction through the twisting handle.

5. The bug zapper according to claim 4, wherein the bottom portion of the collection box is recessed to define a first groove; the first groove extends toward the collection cavity; the twisting handle is disposed in the first groove.

6. The bug zapper according to claim 1, wherein the base comprises a base body and an annular lampshade; the base body is connected to a bottom portion of the main housing; the annular lampshade defines an accommodating groove disposed toward the main housing; the annular lampshade is connected to a bottom portion of the base body; the annular lampshade creates an enclosure with the base body in a vertical direction to form the mounting cavity; the LED circuit board is mounted in the mounting cavity.

7. The bug zapper according to claim 6, wherein the bug zapper further comprises a sealing ring disposed between the base body and the annular lampshade; two opposite sides of the sealing ring respectively abut against the base body and the annular lampshade; and/or the annular lampshade is made from translucent material.

8. The bug zapper according to claim 6, wherein a light-emitting direction of the LED circuit board is downward; the bug zapper further comprises a hook connected to a top portion of the housing assembly.

9. The bug zapper according to claim 1, wherein the bug killing assembly comprises a lamp tube and a power grid; the lamp tube is disposed in the accommodating space; the power grid is disposed in the accommodating space and surrounds an outer periphery of the lamp tube;

the second bracket is located below the lamp tube and the power grid; a bottom portion of the lamp tube is disposed in the second mounting groove;

a fixing groove is defined on a top portion of the fixing portion; a bottom portion of the power grid contacts a bottom wall of the fixing groove.

10. The bug zapper according to claim 9, wherein the housing assembly further comprises a first bracket; the main housing defines the accommodating space and the through holes; the first bracket is disposed on a top portion of the main housing;

a first mounting groove and a mounting portion are disposed on a bottom portion of the first bracket; a lamp holder of the lamp tube is embedded in the first mounting groove; the power grid is sleeved on an outer peripheral surface of the mounting portion.

11. The bug zapper according to claim 10, wherein the bug zapper further comprises a control assembly; the control assembly is disposed on the housing assembly and is disposed above the bug killing assembly; the first bracket comprises a wiring hole; a wire of the lamp tube and a wire of the power grid pass through the wiring hole and are electrically connected to the control assembly.

12. The bug zapper according to claim 1, wherein the bug zapper further comprises a control assembly; the control assembly is disposed on the housing assembly and is disposed above the bug killing assembly; the bug killing assembly and the LED circuit board are controlled by the control assembly.

13. The bug zapper according to claim 12, wherein the housing assembly further comprises a top cover and a first bracket; the first bracket is disposed on a top portion of the main housing; the top cover is disposed on a top portion of the first bracket; the top cover is connected with the first bracket to cooperatively create an enclosure and define a mounting space; the control assembly is mounted in the mounting space.

14. The bug zapper according to claim 13, wherein the main housing further comprises first ribs extending in a vertical direction; a wiring channel is defined inside the first ribs; a first wire hole is defined on the base to communicate a mounting cavity of the base with an outside; a second wire hole is defined on the first bracket to communicate the mounting space with the outside;

a conductive wire of the LED circuit board passes through the first wire hole and the wiring channel, extends to the top portion of the main housing, and passes through the second wire hole to be electrically connected to the control assembly.

15. The bug zapper according to claim 14, wherein the main housing comprises a first housing and a second housing; both the first housing and the second housing comprise the first ribs; second grooves are defined on side surfaces of the first ribs; the first housing is fastened to the second housing in a horizontal direction to form the wiring channel.

16. The bug zapper according to claim 15, wherein first connecting columns are disposed on two sides of the first housing; second connecting columns are disposed on two sides of the second housing; a first mounting hole is defined on each of the first connecting columns, and a second mounting hole is defined on each of the second connecting columns; each first mounting hole is connected to a corresponding second mounting hole through a connecting piece, so that the first housing is connected to the second housing.

17. The bug zapper according to claim 14, wherein the main housing further comprises second ribs extending in a horizontal direction; the first ribs and the second ribs are connected to define the through holes.

18. The bug zapper according to claim 12, wherein the control assembly comprises a control circuit board and a control switch; the bug killing assembly and the LED circuit board are electrically connected to the control circuit board; the control switch is configured to control a working state of the control circuit board.

19. The bug zapper according to claim 1, wherein a bottom wall of the second bracket corresponding to the second mounting groove is disposed at a side of the outer peripheral wall away from the main housing.

20. The bug zapper according to claim 1, wherein the first holes are disposed between a side wall of the second bracket corresponding to the second mounting groove and the outer peripheral wall; the second holes are disposed between the inner outer peripheral wall of the fixing portion and the inner side surface.

\* \* \* \* \*